United States Patent [19]

Castet

[11] 4,088,840

[45] May 9, 1978

[54] ELECTRONIC CROSS-POINT MATRIX TELEPHONE PRIVATE SWITCHING EQUIPMENT

[75] Inventor: André Castet, Pessac, France

[73] Assignee: L'Electronique Appliquee, Montrouge, France

[21] Appl. No.: 679,045

[22] Filed: Apr. 21, 1976

[30] Foreign Application Priority Data

Apr. 21, 1975 France .................................. 75 12285

[51] Int. Cl.² ............................................. H04Q 3/50
[52] U.S. Cl. ......................... 179/18 GF; 179/18 AD; 179/18 ES
[58] Field of Search ....... 179/18 GF, 18 AD, 15 AT, 179/18 ES

[56] References Cited

U.S. PATENT DOCUMENTS

| | | | |
|---|---|---|---|
| 3,141,067 | 7/1964 | Spandorfer | 179/15 AT X |
| 3,433,900 | 3/1969 | Schlichte | 179/15 AT |
| 3,694,812 | 9/1972 | Enomoto | 179/18 GF X |
| 3,786,194 | 1/1974 | Pinede et al. | 179/18 AD |
| 3,881,066 | 4/1975 | Macrander et al. | 179/18 GF |
| 3,943,297 | 3/1976 | Pommerening et al. | 179/18 GF |

*Primary Examiner*—Thomas W. Brown

*Attorney, Agent, or Firm*—Kemon & Estabrook

[57] ABSTRACT

A telephone private switching equipment of the space-division operated type comprises a matrix of electronic switch cross-points each made of a single controllable two-state member connected across a conversation conductor of a row and a conversation conductor of a column of the matrix and having a trigger terminal connected through unidirectional members to both a cross-point activation conductor of this row and a cross-point activation conductor of this column, each row and each column comprising only these two conductors. Each column of the matrix is controlled from a cross-point selection control unit capable of applying trigger pulses to the cross-point activation conductor of the column and service voltages and currents to the conversation conductor of the column. Each subscriber's line circuit of the equipment includes a two-wire to one-wire converter the one-wire terminal of which is connected to the conversation conductor of a row and includes means capable of applying periodical pulses to the cross-point activation conductor of this row. Each external network line connecting circuit of the equipment is connected by a one-wire conversation lead to the conversation conductor of a row comprising only a single cross-point of the matrix.

10 Claims, 7 Drawing Figures

Fig. 1c (INVENTION)

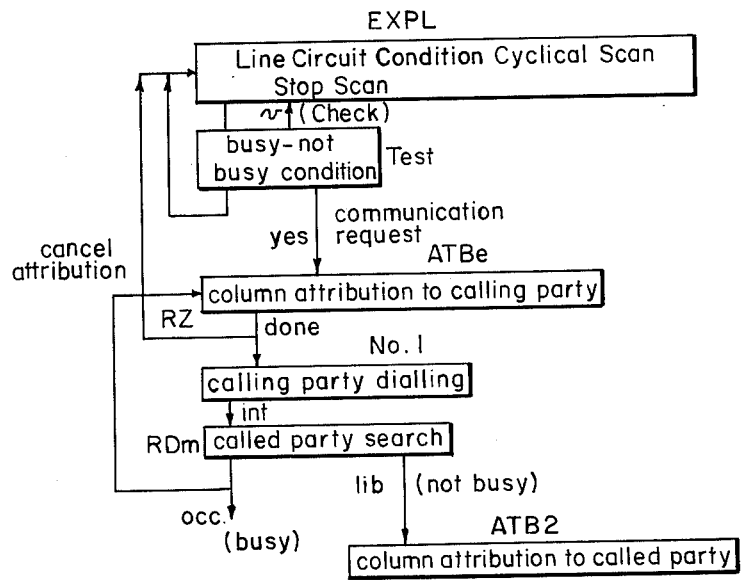
Fig. 1b (PRIOR ART)
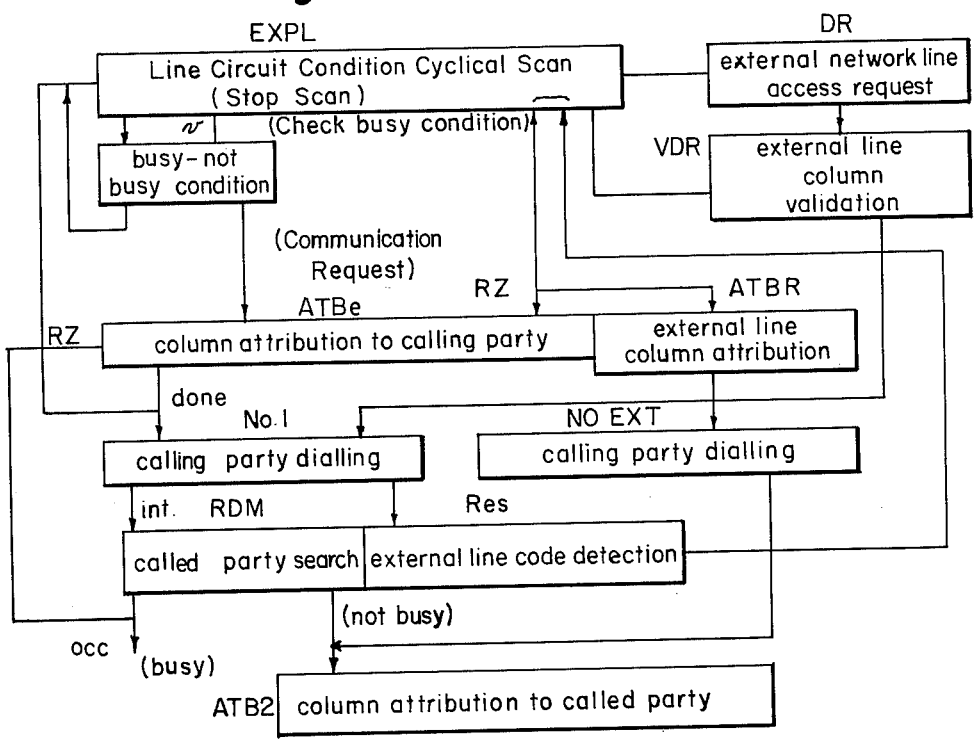
Fig. 1d (INVENTION)

ELECTRONIC CROSS-POINT MATRIX TELEPHONE PRIVATE SWITCHING EQUIPMENT

SHORT SUMMARY OF THE INVENTION

The present invention concerns improvements in or relating to electronic telephone private switching equipment adapted to handle traffic of about 50 to 250 connections to the external telephone line network.

It further concerns such equipment which use conventional two-conversation wire subscriber's sets which can be conventionally called by a ringing signal having the frequency of the electrical mains.

The invention particularly concerns such equipment which is operated on a space-division basis, the general organization of which is illustrated in FIG. 1 (a) of the attached drawings. According to this organization, the switching equipment comprises a logical control unit LOG which is in two-way linkage with subscriber's line circuits AB, from O to $n$, and external network line connecting circuits ER, from 0 to $q$. The intercommunications are established between the circuits by means of a matrix made of columns Bo, B1, ...,B$n$, B$n$+1, ... and of rows L0, L1, .. L$m$, ... L$m$+1, ... L$m$+$q$ and of electronic switch cross-points such as PC defining the intersection points between these columns and these rows. Each row is connected to a circuit AB or a circuit ER. Each column is connected to a cross-point selection control unit CB, from 0, 1, ..., $n$, $n$+1, ... each controlled from the logical control unit LOG for selective activation of the cross-points PC on a X-Y addressing basis. The actual number of rows is determined by the number of subscribers in the private switching equipment and of external network lines connected to the equipment. On the other hand, the number of columns is defined by the density of the traffic which is required for the equipment.

Shortly summarized, the algorithm of operation of such an equipment may be termed as follows, reference being made to the full line part of FIG. 1(b) which illustrates such an algorithm:

The logical control unit LOG ensures a systematic permanent scan EXPL of the conditions of the subscriber's line circuits and of the external network line connecting circuits. This scan is executed in a looped sequence with an automatic advance of the addresses allotted to the said circuits. Each step of the sequence tests the condition of the corresponding circuit. When this TEST operation detects an occupied condition, a check order, $v$, is sent back to the EXPL routine which is stopped and enters into a check routine determining whether said occupied condition results from an actual communication connection or from a communication connection request. In this second alternative, the TEST issues an order yes which results in the allotment of a column of the matrix to the caller set or line circuit. Once this attribution phase ATB is over, inhibition of the EXPL phase is cancelled. The scanning operation is resumed by the logical unit LOG. Simultaneously, the caller is requested to dial the number of the party he wishes to call. During this phase NoI, the logical control unit LOG proceeds to a search of the called party, subroutine RDm. When this party is occupied, the occupancy signal occ is send back to the calling party and the same signal resets the phase ATBe. When the called party is not occupied, a signal lib is directed to the part of the logical control unit LOG which attributes a column to the said called party, routine ATBr.

Such an equipment and such an algorithm necessitate a high number of cross-points of the matrix and such cross-points usually are of a relatively high complexity, thereby necessitating the switching of a relatively high number of circuits as for instance: — at least one pair of conversation conductors, a ringing current conductor, a call return conductor and at least one dialling pulse conductor per row and per column. The cross-point proper usually comprises several "memory" solid-state switch members such as the ones known as "thyristors".

It is the object of the invention to provide an equipment adapted to be controlled in a time and space division process as hereinabove described which embodies a single switching matrix of a highly simplified design in that it permits a single two-condition electronic switch member per cross-point for switching a single pair of row and column conductors. Each pair comprises a cross-point selection conductor and a conversation conductor and the conversation conductor of a column is also used in the switching process of the electronic switch members which are connected thereto.

BRIEF DESCRIPTION OF THE DRAWINGS

The invention will be described in full detail with reference to the accompanying drawings, wherein:

FIG. 1b shows an algorithm for operation of the equipment of the type shown in FIG. 1a;

FIG. 1c shows a modification of FIG. 1a when the invention is put into practice. This modification consists in the omission of cross-points PC in the matrix between the external network line circuits ER and the columns of said matrix but a single cross-point per such external network line and a single one particular column is maintained. For instance, the single cross-point PC is maintained between line M$m$+1 and column B$n$, the single cross-point is maintained between L$m$+$q$ and B$n$+1 etc.

FIG. 1d shows the algorithm of operation of the equipment of FIG. 1c;

FIG. 2 shows an illustrative embodiment of the cross-point selection control unit of a column of the matrix together with a partial representation of the controlled column and of other columns of the matrix, included one column devoted to the access of an external network line to the equipment according to the above stated subsidiary feature of the invention, FIG. 3 shows an illustrative embodiment of a subscriber's line circuit of the equipment, adapted to be connected to a row of the matrix of FIG. 2 and to cooperate with the cross-point selection control unit of the said FIG. 2, and, FIG. 4 shows an illustrative embodiment of an external network line connecting circuit of the equipment, adapted to be connected to a cross-point of the matrix of FIG. 2.

DETAILED DESCRIPTION

Figure 1A:
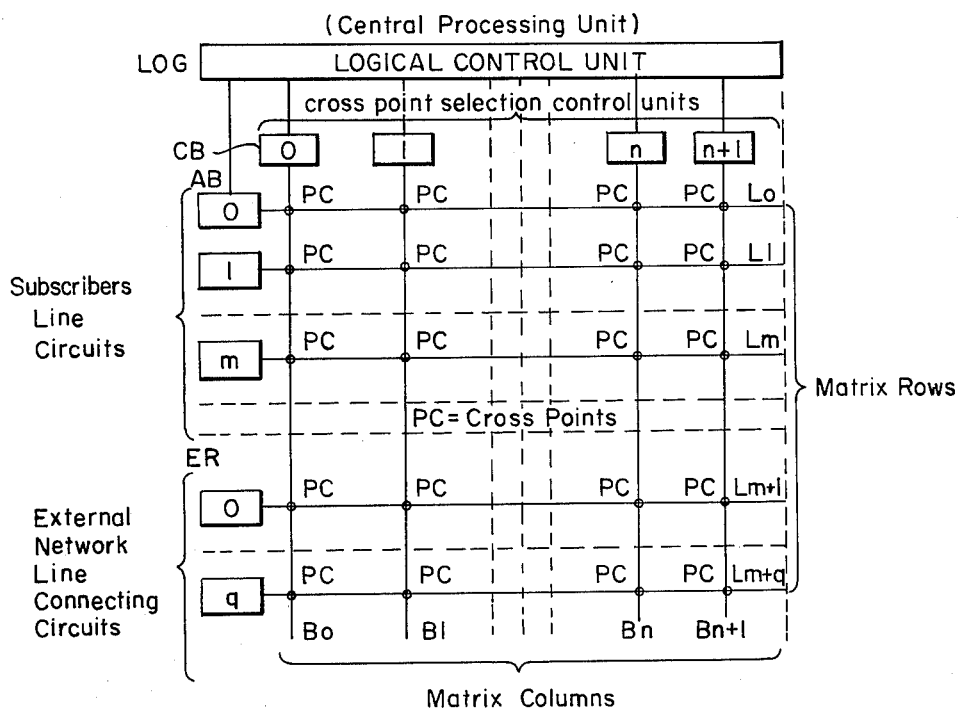
FIG. 1a shows the general organization of the prior art equipment of the type to which the present invention relates.
Figure 1A:
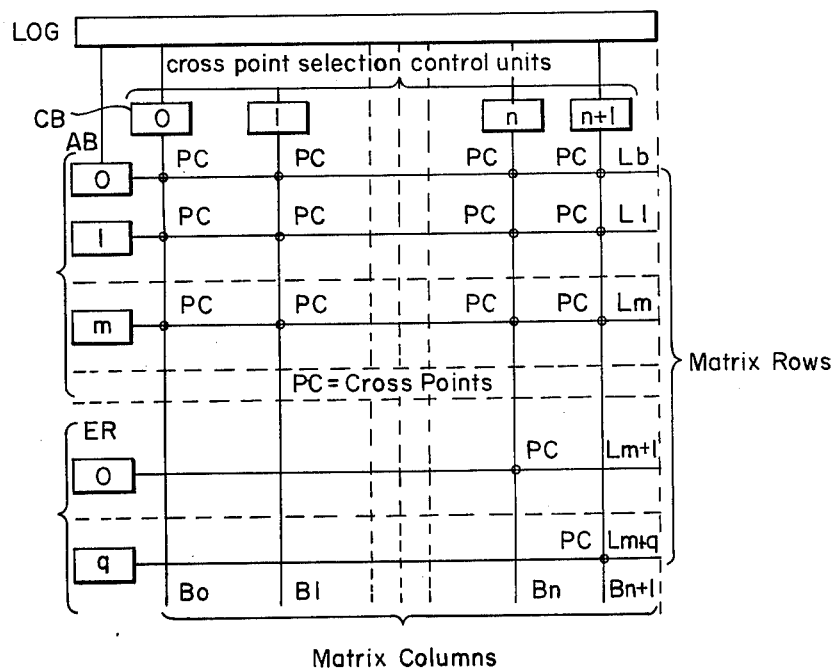

The modification of the algorithm shown in FIG. 1d will be first described. It must be emphasized that this modification does not necessitate in the logical control unit LOG any addition or modification of the prior commonly used hardware.

In this modification, any access request DR from an external network line connecting circuit temporarily inhibits the progression of the scan EXPL and, pursuant thereto, the circuits which control said EXPL. routine answer by activating means validating at VDR the column of the matrix wherein is connected the cross-point allotted to the said external network line connecting circuit. This validation process gives access to either an operator's position, when provided in the equipment or one of the subscriber's line circuit, which has been provided privileged in this respect. The operator's or privileged position may call through the routine NoI the subscriber's set requested from the external network line and consequently have this latter connected to the column allotted to the external network line connecting circuit. When a subscriber of the equipment, after having received the attribution of a column, dials a number which begins by a code pointing to the external network, the detection of this doce Res blocks the prior attribution of the column at ATBe and substitute thereto the attribution of a column, routine ATBR, which possesses an access to the external network. This attribution routes the call to the external dialling facilities, routine marked No EXT in FIG. 1b.

As concerns the hardware of the invention, as is commonly known, the Logic control unit LOG includes, inter alia, a clock controlled time base circuit which generates the relatively shifted signals which are needed for its own operation and for the control of the subscriber's line circuits, the external network line connecting circuit and of the cross-point selection control units associated with the columns of the matrix. The main function of LOG is to attribute (or "distribute") columns to the calling parties and thereafter to execute the operations useful for the establishment of the requested communications and, finally, to control the connections between the subscribers and the columns.

Each subscriber's line circuit is provided with a multi-bit identifying number and so are the external network line connecting circuits.

Each column of the matrix can only have two cross-points in simultaneous activated conditions. Consequently, in the logics only two number stores are allotted for a column within the said logic, one store for storing the number of the calling party and the other one for storing the number of the called party. It is a decoding operation of the contents of these stores which ensures the addressing of the activation controls of the cross-points connected to the columns through the cross-point selection control units of the columns. Also, the decoding operation is used for addressing information exchanges between the AB and the ER circuits.

The establishment of a connection calls for the following means:

The central clock of LOG actuates a scanner which sequentially tests the conditions of the subscriber's line circuits. Each detected condition can only be one of two terms of an alternative:— "hooked" or "unhooked", the words referring to the switchhook of the handset of the subscriber (as translated to a terminal SLE of the subscriber's line circuit of FIG. 3). It consequently necessitates only two marking voltage conditions at a test terminal of the subscriber's line circuit. Each step of the scanner increments by one unit the content of a counter having as many counts as are subscribers in the equipment. At each step, consequently, this counter has a content corresponding to the binary code address of the subscriber's set circuit the SLE terminal of which is connected to the scanner.

When an "unhooked" condition is detected, the advance of the scanner and consequently of the counter is stopped. The central logic must determine if this subscriber has already received an attribution of a column in the matrix or not. The determination is obtained by a systematic search in the number stores of the column attributing logics. If the binary number of the subscriber is found in one of these stores, it means that the subscriber is dialling or speaking to another party; if not, it means that a column must be attributed to the subscriber. The search consists of a sequential read-out of the stores and each read-out step controls a comparator circuit the other code input of which is connected to the binary code number on which the counter is stopped. During the sequence, when a code coincidence is detected, the "yes" output of the comparator re-activates the scanner. At the end of the sequence, if no coincidence has been detected, the binary code number of the subscriber set is copied into a store of a column control logic which is the first "free" one encountered by the column attributing logic which includes an address table in this respect. The scanner is re-started and the cross-point selection control unit of the thus selected column applies to the subscriber's set circuit a dialling request signal. The calling subscriber dials the number of the other party he needs and the corresponding subscriber' set binary code number is stored in the "called party" store of the logics controlling the column which has been attributed to the calling party. Thereupon, the central control logic LOG activates means for systematically and sequentially interrogating the subscriber's binary code stores of the columns logics and comparing their contents to the "called party" binary code number. When a coincidence occurs, the search is stopped and an occupation marking tone signal is sent back to the calling party subscriber's set circuit. When no coincidence occurs during the systematic search, the call signal is sent to the called party subscriber's line circuit. When the called subscriber unhooks his handset, the connection occurs through a second cross-point of the column on which the calling party has already been connected by the activation of a cross-point between his row and the concerned column.

When the calling subscriber begins to dial with a code part pointing to a request of attribution of an external network line, said code part is decoded in the control logic LOG which answers by controlling the transfer of the calling party binary code number from the column control logic store wherein it was first copied into the corresponding calling party binary code number store of a free column logics allotted to a column connected to an external network line connecting circuit. Once the transfer is over, the central logic LOG clears the previously store wherein was first stored the binary code number of the calling party. It must be understood that the above-defined code part pointing to a request of attribution of an external network line does not point to an identified one of such external lines. The calling party will not be informed of such a transfer of attribution of a column and will receive the normal answer signal except when the external line is already occupied, in which case he will receive back the occupancy tone signal.

The above analysis of the operation of the known means of the equipment clearly shows that when, according to the present invention, each row and each column of the matrix each only comprises a single conversation wire and a single cross-point activation wire, i.e., only one pair of conductors, these pairs of conductors of a row and a column being only interconnected by a single cross-point two-state electronic switch, each subscriber's line circuit must be specially provided with means for receiving the ringing current, the dial pulses and the signal to request a break of the communication, as these current and signals cannot be routed through the cross-points of the matrix. Further each subscriber's line circuit, as well as each external network line connecting circuit, must be adapted to the one-wire conversation feature of the matrix.

According to a first subsequent feature of the invention, each subscriber's line circuit and each external network line connecting circuit includes a two-wires to one-wire translator circuit the one-wire terminal of which is connected to the conversation conductor of a row of the matrix.

According to a second subsequent feature of the invention, each subscriber's set circuit includes a local ringing relay controlled by a local store activated from the central logical unit and a local break request signal generator controlled by a further local store activated from the logic control unit of the equipment.

Referring now to FIG. 2, a cross-point in a matrix according to the present invention comprises, connected across the "vertical" (column) cross-point activation conductor $sv$ and the "vertical" (column) conversation conductor $cv$, of the column to which it is connected, a series circuit comprising a resistor $r1$, a un idirectional element $d0$ and a resistor $r0$. The trigger electrode of a thyristor Th is connected to the connection point between $d0$ and $r0$. The cathode of the thyristor is connected to the conductor $cv$. The connection point between $r1$ and $d0$ is connected by a unidirectional element $d1$ to the cross-point activation conductor $sh1$ of the corresponding row of the matrix whereas the anode of the thyristor is connected to the conversation "horizontal" conductor $ch1$ of the said row.

The unidirectional element $d0$ provides a separation between the cross-point activation control circuit and the conversation circuit. The resistance $r0$ is the cathode-trigger bias resistor. The element $d1$ transfers the negative ground which is received by the conductor $sh$ from the subscriber's set circuit connected to the row when said circuit is unactivated. The resistor $r1$ transfers the triggering pulse from the conductor $sv$ when activated.

In FIGS. 2 to 4, the following notations are used:—
OE = electronic zero voltage, actually equals −12 volts,
OCX = − 48 volts distributed throughout the equipment (the −48 volts of the supply of the subscriber's lines is noted −V),
+v = + 12 volts.

In each cross-point selection control unit CB, as for instance the unit $CB_1$, FIG. 2, which controls the cross-points (PC) o1, ..., (PC)11, ..., the cross-point activation conductor $sv1$ is connected through a unidirectional element $d12$ to the output of an amplifier (AMPI) which receives at the terminal IAT the trigger pulse for the thyristor of the cross-point which is at the same time instant selected at $sh$ by the subscriber's set circuit connected to the row of which $sh$ is a conductor. This selection process will be herein later described.

The conversation conductor $cv$ of each column is connected in the unit (CB) of the said column, to an electrical current source SCB under a voltage which is maintained at a constant value by the Zener Z2. The electrical current source is activated when the terminal PB of the unit receives a voltage which develops a D.C column bias from the progressive charge of a condenser circuit (MPB). PB receives said voltage at the time instant of attribution of a column to a subscriber which requests the establishment of a communication. Conversely, the liberation of a column is obtained by the application to the terminal LB of the unit of a signal ensuring the progressive discharge of the condenser of (MCB) through a transistor it unblocks. During the time interval of occurrence of the signals PB and LB, the condenser C1 has maintained in activity the electrical current source SCB. The D.C. voltage on $cv$ is limited by the zener Z1 and a diode $d10$ so that the transistor CC coupling (MCB) to (SCB) is protected against any parasitic or stray action which may be due to the voice frequency modulations on $cv$ during the communication, and the electrical current from (SCB) is maintained at a value unaffected by these modulations.

In order to avoid untimely triggering of the thyristors of the column, the control unit comprises triggerring preparation means for ensuring a progressive rise of the cathode-anode voltage of the thyristors. Said means comprises a circuit (MPA) having a condenser C2 which is charged by the application of a voltage step to an input PA and having an output circuit SPA connected to the conversation conductor $cv$ of the column. Once the triggering has occurred, a further voltage step applied at CA will produce the discharge of C2 through a transistor TLD which is unblocked by the siad voltage step at CA. A diode $d11$ creates in SPA an additional threshold which increases the immunity of the thyristors against stray signals.

Through a further input terminal TON, the conductor $cv$ may receive, when needed, musical frequency signals for dialling request, backcall return and wait on occupied condition of the called party.

A further input I0 is so provided that an operator may enter in an established communication without disturbing the established connections on the column. An operator's set is considered as a peripheral circuit in an equipment according to the invention. When provided, its function will be the normal one, i.e. it will receive all calls from the external telephone network and the operator will dial to the logical control unit LOG the local binary code number of the called party. The LOG unit will then dealt with the incoming call as it handles any other callwithin the equipment. In order not to disturb the communication on an operator's intervention, the activation of I0 will produce a variation of the thyristor bias current on $cv$ which will compensate for the introduction of a dummy impedance simulating a third cross-point in the communication circuit.

The pair of conductors $sh$ and $ch$ of a row is connected to respective wires of a subscriber's line circuit such for instance as the circuit (AB1) shown in FIG. 3.

In this circuit, the conductor $sh$ is connected to the output of a transistor SCTh which is blocked each time a temporary circuit validation signal is applied from the binary code number decoder of the scanner of LOG to the terminal $VDAB_1$. When the transistor SCTR is blocked, the conductor $sh$ is no more connected to the OCX voltage. If during such a condition, a trigger pulse from CB triggers the thyristor in its active state, the electrical current from the biassing source SCB thereafter maintains the thyristor "conducting" and the crosspoint PC connects the conversation conductor $ch$ to the conversation conductor $cv$ of the column.

Of the subscriber's handset connected to the circuit AB1 are only shown, at PAB1, the commutator switch of the handset $cc$ and the dialling pulse contact $cd$. The 5 wires of the handset ends in a two-wire to one-wire converter T, hence the required conversion to the one-wire terminal Ch1 to be connected to the conversation conductor $ch1$ of the matrix row. On the one-wire side, the winding of the translator is shunted by a voltage limiter made of the two reversely connected zeners Z3 and of a pair (D) of the opositely connected unidirectional shunts. In the wire $f$ is inserted a contact of a relay K2 having a shunt diode across its coil, D21, fed through a transistor having its emitter to the OE voltage. The base of the transistor is connected to the output of a gate GA of the NOR kind, one input of which is connected to the output terminal of a store, (MA) of the bistable type. Each control input of (MA) receives an input from an AND-gate unblocked when the signal VDAB1 is present. The store (MA) marks a call to the subscriber when, during a period of presence of VDAB1, a voltage is applied to the input AP. The reset of the store is similarly ensured by application of a reset voltage to the input terminal AA. When K2 is energized, it applies the ringing current under 70 Volts on the converter T, contact of K2 at work so that the A.C. current is applied to the ring of the unshown subscriber's telephone set. On the other hand, when K2 is unactivated, its contact, in the rest position which is shown in the drawing, the double shunt (D) protects the converter against any overvoltage which could be due to the ringing circuit at the time instant of the reset to rest of the contact of K2. A zener Z5 and a thermistor RT respectively ensure a voltage and a current limitation on the handset's side, a condenser associated with the zener and the thermistor enabling the transmission of the low frequency modulation to the subscriber.

On the subscriber's side, the winding of the converter T is divided into two half-windings connected by a condenser; one half-winding is connected to ground and the other one is connected to $-V$ through the coil of a relay K1. The actuation circuit of this relay K1 passes through the loop of the subscriber's set, which closes through the commutator switch $cc$ and the dialling contact $cd$. When the subscriber unhooks, $cc$ closes the loop, the relay K1 is actuated and closes the circuit which, at its contact $k1$, applies the voltage $+v$ to the gate GA and to an output NAND gate GLE connected to the terminal SLE, through a diode $d20$, which must be understood as being the terminal the condition of which marks the condition of the subscriber's set for the condition scanning means of LOG. The gate GLE is unblocked at each application of a test voltage at VDAB1 provided a bistable store (MIR) is at rest. When this stor (MIR) is actuated from the applicaton of a signal at the terminal IR which is connected to its set input through an AND-gate controlled from VDAB1, GLE is blocked, but, through the NOR-gate GT, the tonality signal permanently applied at TONIR to the circuit is transmitted through the transistor IGT to the converter T and consequently applied to the unhooked subscriber's set.TONIR is a tonality signal requesting the subscriber to break the communication by depositing his handset on its hook. On the side of the matrix, the circuit comprises an impedance adapter stage Te which is both de-coupled against the voice frequencies and shunted by a constant D.C. generator TLN. The zener Z4 ensures the constant feature of the current. When the subscriber actually replaces his handset on the hook, the stor (MIR) is reset by the voltage $+v$ passing through the OR gate GRz at the time instant when VDAB1 is applied to the circuit.

As the dialling through contact $cd$ opens and closes the subscriber's loop, the relay K1 follows the dialling and the dial pulses are transmitted from SLE to the logic control unit LOG.

Unhooking operation of the subscriber interrupts a ringing signal through the gate Ga from the closure of $k1$ before the resetting of (MA) by the reset signal is applied to AA.

Turning back to the cross-point column control unit CB, TEF is an input terminal adapted to ensure the connection of a "dummy thyristor" to the conversation conductor $cv1$ of the column. Two thyristors will be normally connected to each column during a communication in activated or conducting conditions thereof. The input terminal TEF enables the simulation of the existence of a second conducting thyristor as long as one only is so connected to the column, after a connection request but prior to the satisfaction of this request of a subscriber. This "dummy thyristor" connection balances the voltages and currents in the matrix.

In equipment such as herein above described, the establishment of a communication between two subscribers may be stated as follows:

A subscriber wishes a communication with another subscriber of the equipment. He raises his handset from its hook and consequent marking occurs at the terminal SLE of the subscriber's set circuit AB. At the first passage of the scanner on this terminal, VDAB is validated and the logical control unit LOG stops the scanning and operates for attributing a column to the subscriber by applying to the terminal PB of the cross-point control unit it selects the signal controlling the application of the bias voltage to the conversation conductor $cv$ of its column. All thyristors connected to this conductor are consequently biassed. Thereafter, the unit receives the voltage preparing the triggering of a cross-point thyristor, on the terminal PA. When the terminal VDAB of the subscriber's set circuit is reactivated, a trigger pulse is simultaneously applied to IAT. The selection is operated and the thyristor of the cross-point connected to the row to which the calling subscriber's line circuit is connected is turned conducting.

The tonality signal requesting the thus connected subscriber to dial the number of the subscriber's set he wishes to reach is applied to the TON input of the cross-point activation control unit. The calling subscriber dials and if the called party is not occupied, at the nest passage of the scanner on the called party subscriber's set circuit, the process is repeated in that another triggering pulse is send to the conductor $sh$ of the same column and the thyristor of the cross-point of said column to which is connected the row of the called subscriber's line circuit is turned conducting. Up to this second trigger pulse, the input TEF of the concerned CB unit had been activated for the simulation of a dummy thyristor and the second trigger pulse de-activates this terminal TEF. The call is applied on the terminal AP of the called party subscriber's line circuit, stored into (MA), ringing occurs. When the called subscriber unhangs his handset from the hook, the relay K1 modifies the voltage at the terminal SLE of his circuit at the next passage of the scanner on this circuit. Ringing is stopped and thereafter the store Ma is reset by the reset voltage which is applied to the terminal AA. When the communication is over, a liberation control voltage is applied to the terminal LB of the column contol unit involved in this connection and, as above explained, the electrical current source (SCB) is turned off and the thyristors consequently turn off.

After the second triggering pulse occurence, a control voltage was applied to CA for cutting the voltage which prepared the triggering of the thyristors. When said voltage is applied as soon as the occurrence of the first trigger pulse, then the preparation of trigerring is repeated before the second occurrence of the triggering pulse.

When an operator's position is provided in the equipment, and the operator wishes to intervene in an established communication, the terminal I0 of CB receives an additional current of a suitable value to temporarily implement the current already applied to the conductor cv of the column so that three cross-point thyristors can be maintained in conducting condition on this column. The operator's position possesses a special row of the matrix on the conductors of which the siad operator can manually apply the suitable voltages for forcing the selection and triggering of the thyristor which, in said row corresponds to the column already occupied by the communication.

The connection of the equipment to the external network lines is ensured through appropriate line connecting circuits connected to specialized cross-points on certain columns of the matrix such as is the PCR crosspoint illustrated on FIG. 2. The circuitry of such a cross-point is similar to any other cross-point except that the conversation conductor of the row is connected at CHj to a single external network line connecting circuit ER. The terminal SRj of the cross-point activation conductor of the row must be understood as directly connected to a marking output of the column logics circuitry in LOG since a single column and consequently a single control unit CB corresponds to a single external network line connecting circuit. Apart from this modification, there is no difference at all between the cross-point control units of the subscriber's line circuits and of the mixed subscriber's line and external line connecting circuits.

An illustrative embodiment of an external network line connecting circuit in a telephone equipment such as above described is shown in FIG. 4, wherein TR is the converter ensuring the two-wire to one-wire conversion of the conversation path from outside to inside, i.e., the matrix, terminal $CR_j$. The winding of TR on the matrix side is shunted by the same bidirectionnal shunts (DR) as is the converter T of the subscriber's line circuits.

Across the wires of the incoming line LR, upstream of a relay contact $K04$ inserted in one of the wires, a call relay $k03$ is connected through a rectifier bridge RD. A unidirectional connection $d34$ ensures a protective threshold against the low modulation frequencies of the voice currents. The relay K03 detects the calls to the circuit and its contact $k03$ is connected to an output terminal SL to the external call receiver part of the logical control unit of the equipment. Across the wires LR are connected two relay coils K01 and K02 which are respectively actuated by opposite polarity currents, due to the series connections of the diodes $d32$ and $d33$ in their paths. Each relay is provided with a work contact which, when closed, marks the condition of the external line at the respective terminals DS1 and DS2 to the scan of the logical control unit. It is necessary to provide these two relays because, at the remote caller's set, the call current may be in either direction.

A protection circuit including a thermistance RI is inserted in one of the wires of the translator TR on the external line side.

The series contact $k04$ is a work contact of a relay K04 allotted to the seizure of the network and the sending of the dialling pulses to the network line, incoming at CNj. A diode $d35$ shunts the coil of the relay K04 as a protection against accidental voltage surges from the coil.

What is claimed is:

1. A telephone private switching equipment comprising a plurality of subscriber's line circuits, a plurality of external network line connecting circuits, an intercommunication routing matrix for selective interconnection of the circuits of the said pluralities, said matrix being made of rows and columns having controllable electronic switch cross-points, and a logical control unit including means for ensuring a cyclical scanning of the free, occupied and communication request conditions of the circuits of the said pluralities and means responsive to communication request conditions detected in said circuits for controlling selective activations of electronic cross-points of the matrix performing the establishment of the requested communications, wherein:

each column of the matrix comprises only a single conversation conductor and a single point activation conductor, each row of the matrix comprises only a single conversation conductor and a single cross-point activation conductor, each cross-point of the matrix comprises a single electronic switch member connected across the conversation conductors of a row and a column and having a trigger terminal connected by unidirectional leads to the cross-point activation conductors of said row and said column, each subscriber's line circuit and each external network line connecting circuit includes a two-wire to one-wire conversation converter having its one-wire terminal connected to the conversation conductor of a row in the matrix, each subscriber's line circuit includes means for periodically applying pulses to the cross-point activation conductor of the row to which it is connected, and, each column of the matrix is controlled from a crosspoint selection control unit having first and second terminals respectively connected to the cross-point activation conductor and to the conversation conductor of the column, and including means for applying cross-point activation pulses to the first terminal, means for applying to said second terminal tone and switch bias electrical currents and means for applying to said second terminal in activated condition of a cross-point of the column a unidirectional constant voltage electrical current the path of which closes in the subscriber's line circuit.

2. Equipment according to claim 1, wherein each external network line connecting circuit is connected to a single cross-point of the matrix.

3. Equipment according to claim 1, wherein each cross-point of the matrix comprises a thyristor connected across the conversation conductors of a column and of a row, having its trigger electrode connected through a biassing resistor to the conversation conductor of the column and having said trigger electrode connected to both cross-point activation conductors of the column and of the row through a threshold member circuit responsive to the simultaneous activitations of the said cross-point activation conductors.

4. Equipment according to claim 3, wherein each cross-point selection control unit includes means for temporarily applying a progressively increasing voltage to the said second terminal before application of an activation pulse on the said first terminal.

5. Equipment according to claim 1, wherein the said means for applying to said second terminal a unidirectional constant voltage electrical current includes means responsive to an order of cancellation of the established communication for progressively reducing the value of the voltage under which said electrical current is applied.

6. Equipment according to claim 5, wherein the said means for applying to said second terminal a unidirectional constant voltage electrical current includes means responsive to the connection of a third party to the established conversation path through a pair of activated cross-points for controlling an increase of the value of the said electrical current.

7. Equipment according to claim 5, wherein the said cross-point selection control unit includes means responsive to the activation of a cross-point of the column to which said unit is connected for connecting to the said second terminal of the unit a dummy cross-point current consuming impedance and means responsive to the activation of a further cross-point in the column for disabling said dummy cross-point current consuming impedance connecting means.

8. Equipment according to claim 1, wherein each subscriber's line circuit includes the combination of means for temporarily storing an incoming call signal and for generating a local tone call signal responsive to such storage, internal condition marking means having a terminal connected to the said circuit condition scanning means; and local dialling means having an output connected to the said terminal, and means for receiving from the comversation conductor of the row to which it is connected in the matrix a tone signal of local dialling incitation.

9. Equipment according to claim 8, wherein said subscriber's line circuit further includes means for temporarily storing a signal requesting the subscriber to break the communication and for generating a local tone signal communication break request.

10. Equipment according to claim 1, wherein said subscriber's line circuit means for periodically applying pulses to the cross-point activation conductor of the row to which it is connected comprises pulse forming means responsive to the application of each scan signal from said circuit condition cyclical scanning means, consequently enabling activation of any cross-point electronic switch connected to said cross-point activation conductor of the row.

* * * * *